Jan. 16, 1923. 1,442,297.
C. O. RIEDEL.
PROGRESS INDICATOR FOR MOTION PICTURES.
FILED JULY 1, 1920.

Patented Jan. 16, 1923.

1,442,297

UNITED STATES PATENT OFFICE.

CARL OSCAR RIEDEL, OF MILWAUKEE, WISCONSIN.

PROGRESS INDICATOR FOR MOTION PICTURES.

Application filed July 1, 1920. Serial No. 393,264.

*To all whom it may concern:*

Be it known that I, CARL OSCAR RIEDEL, a citizen of the United States, and resident of Milwaukee, in the county of Milwaukee and State of Wisconsin, have invented new and useful Improvements in Progress Indicators for Motion Pictures, of which the following is a description, reference being had to the accompanying drawings, which are a part of this specification.

The invention relates to moving pictures and more particularly to an indicator to show how much of the film has preceded.

Many people who come late to a motion picture exhibition like to know how far along the picture has progressed prior to their arrival so that they can form a better idea of the story. The present invention is designed to furnish this information, preferably in a graphical manner.

The invention further consists in the several features hereinafter set forth and more particularly defined by claim at the conclusion hereof.

Figure 1:
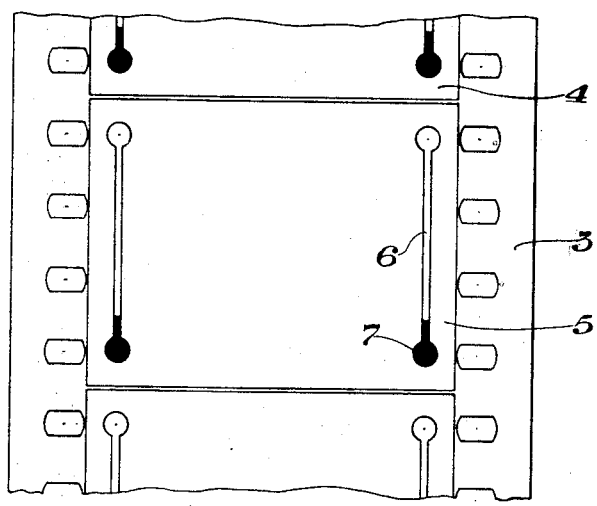
Figure 2:
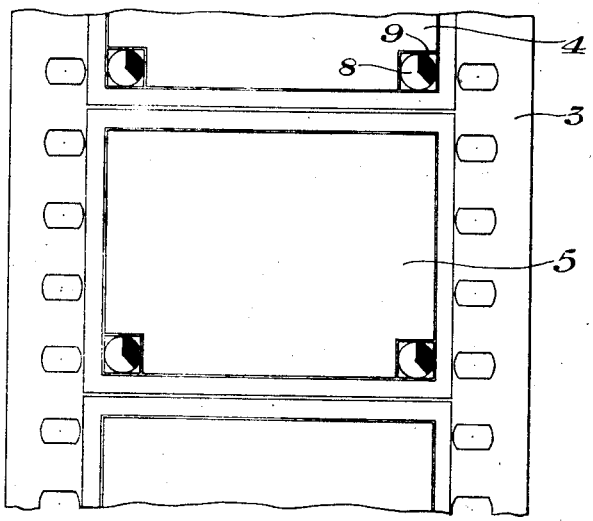

In the drawings: Fig. 1 is a detail view of a motion picture film provided with an indicator embodying the invention; Fig. 2 is a similar view showing another form of indicator.

In the drawings, the numeral 3 designates a section of a motion picture film and 4 and 5 parts of the film carrying the title or the picture. To indicate to the audience, and more particularly those arriving late, how far along the picture has progressed prior to their arrival, I provide at intervals upon the film indications for this purpose. These indications which may appear upon the margin of one of the titles or pictures are graphical designs as shown in the drawings. In Fig. 1 I have shown an indicator consisting of a bulb-like representation 6 in which the blackened portion 7 indicates graphically what part of the whole picture has been shown. In Fig. 2 I show circles 8 in which the blackened sector 9 indicates graphically what part of the whole picture has been shown. These indications are preferably placed on that portion of the film in which the titles or reading matter is displayed and the graphical indications enable the patron to tell at a glance how much of the picture has been shown previous to his arrival.

I desire it to be understood that this invention is not limited to any specific form or arrangement of the indicators except in so far as such limitations are specified in the claim.

What I claim as new and desire to secure by Letters Patent is:

A moving picture film having thereon, at intervals, graphical designs with variable contrasting areas to indicate to the audience the progress of the film.

In testimony whereof, I affix my signature.

CARL OSCAR RIEDEL.